June 24, 1930.  J. O. WOODS  1,766,009
SAW SET
Filed May 11, 1929  2 Sheets-Sheet 1
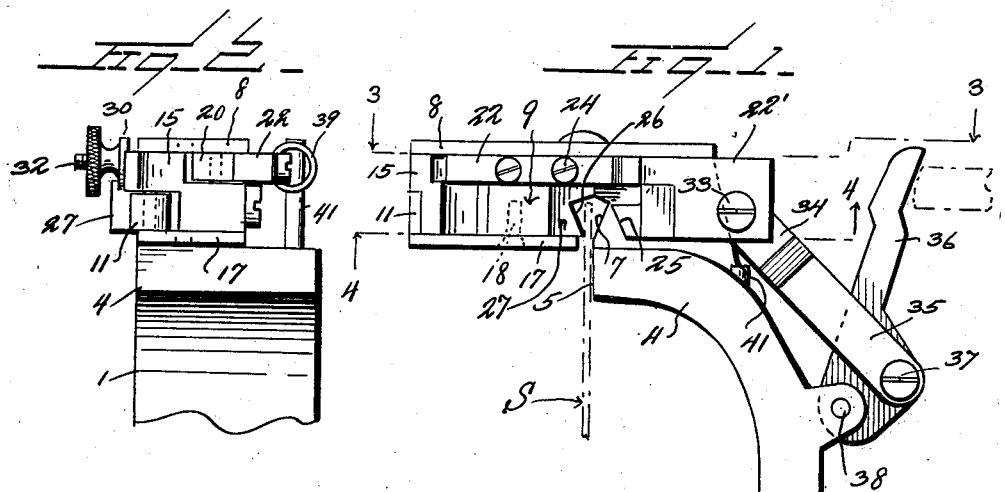
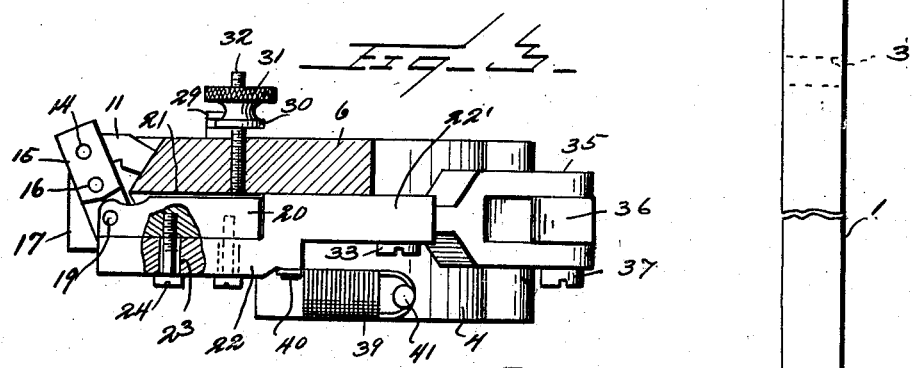
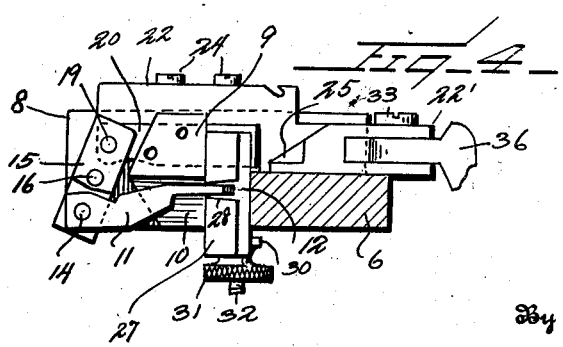
Inventor
J. O. Woods
By Watson E. Coleman
Attorney June 24, 1930. J. O. WOODS 1,766,009
SAW SET
Filed May 11, 1929 2 Sheets-Sheet 2
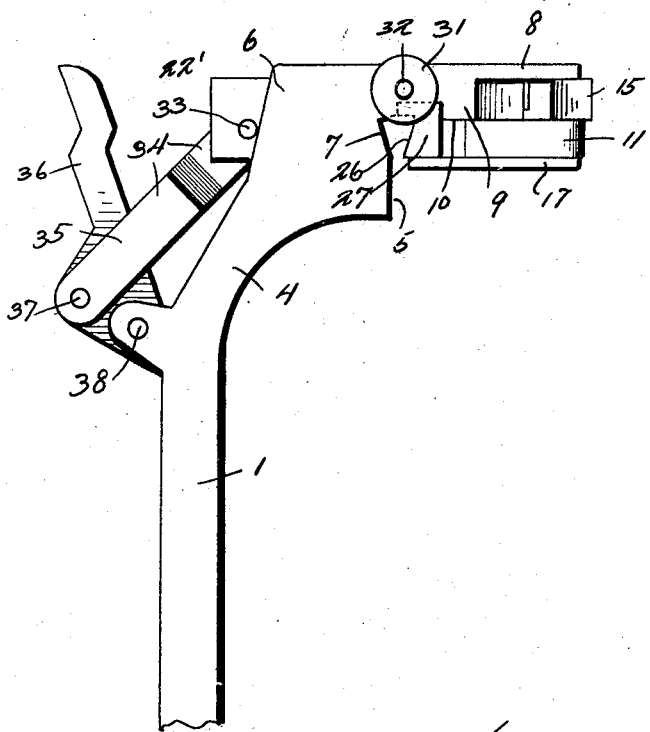
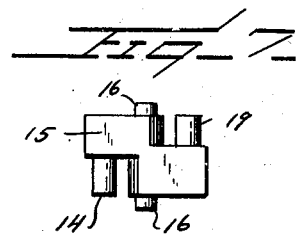
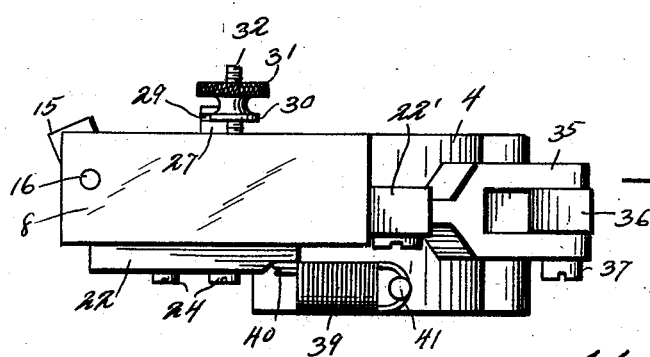
Inventor
J. O. Woods
By Watson E. Coleman
Attorney Patented June 24, 1930

1,766,009

UNITED STATES PATENT OFFICE

JAMES ORVILLE WOODS, OF CHEYENNE, WYOMING.

SAW SET

Application filed May 11, 1929. Serial No. 362,351.

This invention relates to a saw set and it is an object of the invention to provide a device of this kind embodying a structure whereby adjacent teeth of a saw by a single operation are properly set, and also to provide a device whereby the desired setting of the teeth of a saw may be effected rapidly and accurately.

The invention consists in the details of construction and in the combination and arrangement of the several parts of my improved saw set whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation, with a portion omitted, of a saw set constructed in accordance with an embodiment of my invention, an applied saw being diagrammatically indicated by broken lines and also an operating member indicated by broken lines;

Figure 2 is a view in front elevation of the structure as illustrated in Figure 1 with a portion of the shank or stem broken away;

Figure 3 is an enlarged sectional view taken substantially on the line 3—3 of Figure 1;

Figure 4 is an enlarged sectional view taken substantially on the line 4—4 of Figure 1;

Figure 5 is a fragmentary side elevational view opposite to that shown in Figure 1;

Figure 6 is a view in top plan of the structure as illustrated in Figure 1;

Figure 7 is a view in elevation of the rock lever herein employed and unapplied;

Figure 8 is a view in end elevation of the sliding anvil block as herein employed;

Figure 9 is a view in side elevation of the sliding anvil block as illustrated in Figure 8.

As disclosed in the accompanying drawings, 1 denotes an elongated member or shank having extending from one of its faces a pin 2 and also provided with an opening 3 as indicated by broken lines in Figure 1 to afford means whereby the shank or member may be anchored in position upon a desired support. It is to be understood, however, that I do not wish to limit myself to any particular structure or means for holding the shank or member 1 in desired working position.

The upper portion of the member or shank 1, as herein disclosed, is disposed laterally upon a desired curvature, as indicated at 4, providing a flat end surface or wall 5.

The free extremity of the portion 4 has extending upwardly therefrom a fixed anvil block 6, said block extending partially across the portion 4 from one side thereof. The block 6 has disposed across its outer face a groove or channel, the base wall 7 of which being disposed on an upward and outward incline and constituting the working face of the block. Extending forwardly from the upper portion of the block 6 is a plate 8, said plate being also disposed a desired distance laterally beyond the inner face of the block 6 and extending across the upper portion of said inner side face of the block. The plate 8 a desired distance in advance of the block 6 has formed therewith a depending block 9, said block extending partially across the plate 8 from a side thereof. The outer side of the block 9 is provided with a groove or channel 10 which freely receives an elongated arm 11, the end portion of which opposed to the working face 7 of the block 6 constituting a setting die 12. The opposite or outer end portion of this arm 11 is pivotally connected, as at 14, to an end portion of a rock lever 15. This rock lever 15 midway its ends is provided with the oppositely disposed trunnions 16 whereby the lever is pivotally engaged with the adjacent end portion of the plate 8 and an applied bottom plate 17. This plate 17 is maintained in desired position by one or more screws 18 extending through the bottom plate and in proper engagement with the adjacent portion of the depending block 9. With the plate 17 in applied position the lever 15 is effectively held against displacement.

The opposite end portion of the lever 15 has pivotally connected therewith, as at 19, the outer end portion of an elongated member 20. This member 20 is freely disposed through a groove 21 provided in the upper portion of the block 9. Overlying the outer side face of the member 20 is the rear end portion of an elongated member 22. This elongated member 22, as herein disclosed, is provided with a series of longitudinally disposed slots 23 through each of which is directed a headed member 24 in threaded engagement with the member 20. By this means the members 20 and 22 may be readily adjusted lengthwise one with respect to the other and firmly locked in any desired selective adjustment.

The forward portion 22' of the member 22 is inwardly offset bringing the same in longitudinal alignment with the member 20. The outer or free end portion of the member 22 constitutes a setting die 25. This setting die 25 is opposed to a suitably beveled or working face 26 carried by a sliding anvil 27. This anvil 27 is mounted for endwise movement in a direction transversely of the plate 8. The anvil 27 when applied has its rear face in contact with the inner face of the block 9 and the anvil 27 is also snugly received between the inner portion of the applied bottom plate 17 and the portion of the plate 8 immediately adjacent to the block 9 and above said inner portion of the plate 17.

The anvil 27 at the required point intermediate its ends has its lower portion provided with a groove or channel 28 through which freely moves the outer or working end of the arm 11.

By proper endwise movement being given to the anvil 27 the setting die 12 may be adjusted toward or from the setting die 25, thus affording means whereby the tool may be selectively adjusted for use in connection with saws of differing gauge, that is to say, saws having a varying number of teeth per inch.

To facilitate the mounting and proper functioning thereof, the lever 15 has its opposite end portions offset in the same general direction as its axis of rotation as is particularly illustrated in Figure 7.

In the present embodiment of my invention, the outer end portion of the anvil 27 is provided in its upper face with a transversely disposed groove or channel 29 which receives a flange 30 carried by a nut 31. This nut 31 is threaded upon a shank 32 carried by and extending outwardly from the outer side face of the plate 8. By rotating the nut 31 in the requisite direction, the anvil 27 may be moved in a direction to effect the desired adjustment between the setting dies 12 and 25.

The outer or free extremity of the portion 22' of the member 22 has pivotally engaged therewith, as at 33, an end portion of a link 34. The opposite end portion of the link 34 is formed to provide a fork 35 straddling a lever 36 and pivotally connected therewith, as at 37. This lever 36 at a point inwardly of and below the pivotal connection 37 has pivotal mounting at 38 with the member or shank 1. This lever 36 extends upwardly a desired distance and is adapted to be operated in any preferred manner to effect a simultaneous movement of the setting dies 12 and 25 one toward the other.

Normally these setting dies 12 and 25 are at their limit of separating movement and are maintained in such normal positions through the instrumentality of a retractile coil spring 39 of requisite tension, one end portion of which being connected, as at 40, with the member 22 and the opposite end portion in proper engagement with an upstanding post 41, in the present embodiment of my invention, carried by the portion 4 of the member or shank 1.

It is to be noted that the inner end of the applied bottom plate 17 is sufficiently spaced from the flat end wall 5 to permit the ready application of the saw S, the teeth of which are to be set, and also that the sliding anvil 27 is sufficiently spaced from the anvil block 6 for the same purpose as is particularly illustrated in Figure 1 of the accompanying drawings.

The tool, as herein disclosed, can be employed with particular advantage in connection with saw filing machines having an intermittently operated saw carrying frame and a reciprocating file carrying member. When used in connection with such a machine the shank or member 1 is so mounted thereon as to permit the proper positioning of the saw carrying frame with respect to the tool and to bring the lever 36 in the path of a part reciprocating with the file carrying member. By this arrangement, the lever 36 will be swung inwardly to effect the proper setting of adjacent teeth of the saw and the saw S through its frame will be automatically intermittently fed with respect to the saw setting tool whereby the desired setting of all the teeth of the saw may be accomplished in substantially an automatic manner and without any particular labor on the part of the operator after the various parts have once been assembled in desired effective relation.

From the foregoing description it is thought to be obvious that a saw set constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In a saw set, a member provided with a fixed anvil, a plate carried by the outer portion of said anvil and extending in advance thereof, said plate having a depending block in advance of the anvil, an anvil block supported in a position adjacent the inner face of said depending block and supported for sliding movement in a direction transversely of the plate, an arm freely disposed through the block and having a setting die for coaction with the fixed anvil, a rock arm operatively supported by the plate outwardly of the depending block, the first named arm being operatively engaged with an end portion of said rock arm, a member supported by the block for endwise movement and having a setting die for coaction with the sliding anvil block, said endwise movable member being operatively engaged with the opposite end portion of the rock arm, automatic means coacting with said endwise movable member for maintaining the setting dies at their limit of movement from their associated anvils, and means coacting with the sliding member for moving both of the setting dies in unison toward their associated anvils.

2. In a saw set, a member provided with a fixed anvil, a plate carried by the outer portion of said anvil and extending in advance thereof, said plate having a depending block in advance of the anvil, an anvil block supported in a position adjacent the inner face of said depending block and supported for sliding movement in a direction transversely of the plate, an arm freely disposed through the block and having a setting die for coaction with the fixed anvil, a rock arm operatively supported by the plate outwardly of the depending block, the first named arm being operatively engaged with an end portion of said rock arm, a member supported by the block for endwise movement and having a setting die for coaction with the sliding anvil block, said endwise movable member being operatively engaged with the opposite end portion of the rock arm, automatic means coacting with said endwise movable member for maintaining the setting dies at their limit of movement from their associated anvils, means coacting with the sliding member for moving both of the setting dies in unison toward their associated anvils, said sliding member including a separate member in direct operative engagement with the rock arm, and means for adjusting both of said members in a direction lengthwise one with respect to the other.

3. In a saw set, a member provided with a fixed anvil, a plate carried by the outer portion of said anvil and extending in advance thereof, said plate having a depending block in advance of the anvil, an anvil block supported in a position adjacent the inner face of said depending block and supported for sliding movement in a direction transversely of the plate, an arm freely disposed through the block and having a setting die for coaction with the fixed anvil, a rock arm operatively supported by the plate outwardly of the depending block, the first named arm being operatively engaged with an end portion of said rock arm, a member supported by the block for endwise movement and having a setting die for coaction with the sliding anvil block, said endwise movable member being operatively engaged with the opposite end portion of the rock arm, automatic means coacting with said endwise movable member for maintaining the setting dies at their limit of movement from their associated anvils, means coacting with the sliding member for moving both of the setting dies in unison toward their associated anvils, and means for moving the sliding anvil block.

4. In a saw set, a member provided with a fixed anvil, a plate carried by the outer portion of said anvil and extending an advance thereof, said plate having a depending block in advance of the anvil, an anvil block supported in a position adjacent the inner face of said depending block and supported for sliding movement in a direction transversely of the plate, an arm freely disposed through the block and having a setting die for coaction with the fixed anvil, a rock arm operatively supported by the plate outwardly of the depending block, the first named arm being operatively engaged with an end portion of said rock arm, a member supported by the block for endwise movement and having a setting die for coaction with the sliding anvil block, said endwise movable member being operatively engaged with the opposite end portion of the rock arm, automatic means coacting with said endwise movable member for maintaining the setting dies at their limit of movement from their associated anvils, means coacting with the sliding member for moving both of the setting dies in unison toward their associated anvils, and means for moving the sliding anvil block in either direction.

In testimony whereof I hereunto affix my signature.

JAMES ORVILLE WOODS.